United States Patent
Carroll

(10) Patent No.: US 7,490,469 B2
(45) Date of Patent: Feb. 17, 2009

(54) DUAL-FUNCTION STIRLING ENGINE SYSTEM

(75) Inventor: Joseph P. Carroll, Moorpark, CA (US)

(73) Assignee: United Technologies Corporation, Hartford, CT (US)

(*) Notice: Subject to any disclaimer, the term of this patent is extended or adjusted under 35 U.S.C. 154(b) by 136 days.

(21) Appl. No.: 11/500,117

(22) Filed: Aug. 7, 2006

(65) Prior Publication Data
US 2009/0007562 A1 Jan. 8, 2009

(51) Int. Cl.
*F01B 29/10* (2006.01)
(52) U.S. Cl. .......................... 60/517; 60/524
(58) Field of Classification Search ............ 60/517–526
See application file for complete search history.

(56) References Cited

U.S. PATENT DOCUMENTS

| | | | | |
|---|---|---|---|---|
| 4,702,903 A | * | 10/1987 | Keefer | 423/359 |
| 6,216,444 B1 | * | 4/2001 | Nagel | 60/39.63 |
| 6,672,063 B1 | * | 1/2004 | Proeschel | 60/616 |
| 7,181,912 B2 | * | 2/2007 | Mori | 60/616 |
| 7,191,736 B2 | * | 3/2007 | Goldman | 123/1 A |
| 2002/0017098 A1 | * | 2/2002 | Johansson | 60/517 |
| 2004/0221576 A1 | | 11/2004 | Lynch et al. | |
| 2005/0268604 A1 | | 12/2005 | Takahashi et al. | |
| 2006/0123779 A1 | | 6/2006 | Yaguchi et al. | |

OTHER PUBLICATIONS

Article by Cairelli, et al., entitled "Propylene Heat Pipe / -80°C Stirling Cooler / Vacuum Panel Insulation / Stirling R/F," obtained from www.positech-solutions.com, last updated Jun. 29, 1999.
Lunsford, "Alchemy in the Desert?-Technology to Recover Water from Vehicle Exhaust Fumes Would Aid Frontline Troops," from The Wall Street Journal, Oct. 4, 2005.

* cited by examiner

*Primary Examiner*—Hoang M Nguyen
(74) *Attorney, Agent, or Firm*—Kinney & Lange, P.A.

(57) ABSTRACT

A dual-function system comprising a heat source and a Stirling engine movably secured to a motorized machine, where the Stirling engine is positionable to operate in a refrigeration mode and in a power generation mode. The Stirling engine is configured to transfer heat from an exhaust pipe of the motorized machine in the refrigeration mode, and to transfer heat from the heat source to generate electrical power in the power generation mode.

19 Claims, 2 Drawing Sheets

DUAL-FUNCTION STIRLING ENGINE SYSTEM

BACKGROUND OF THE INVENTION

The present invention relates to auxiliary power units (APU) and water recovery systems. In particular, the present invention relates to Stirling engine systems configured to function as APUs and water recovery systems.

Military personnel serving in remote desert environments consume up to 20 gallons of water per day. Supplying such personnel with water involves complex logistics, particularly in emergency situations. One potential technique for providing water to military personnel involves condensing water vapor from the exhaust gases of military vehicles. Fuel combustion in an internal combustion engine produces water vapor, which is expelled with the other exhaust gases. The water vapor is condensed with the use of a portable condenser that is connected to the exhaust pipe of the military vehicle. The condensed water is filtered to remove hazardous contaminants, and may then be used as drinking water.

While portable condensers are suitable for condensing water vapor, such units require electrical power. In the remote environments, electrical power is another necessary resource that is scarce. Electrical power is typically provided with APUs, and is required to power electronic military equipment such as surveillance, illumination, and communication equipment. As such, there is a need for a system that is configured to provide water and electrical power for applications in remote hostile environments.

BRIEF SUMMARY OF THE INVENTION

The present invention relates to a dual-function system for use with a motorized machine that emits exhaust gases through an exhaust pipe. The dual-function system includes a heat source and a Stirling engine, where the Stirling engine is positionable to operate in an electrically-driven, refrigeration mode and in a thermally-driven, power generation mode. While positioned in the electrically-driven, refrigeration mode, the Stirling engine transfers heat from the exhaust pipe to condense liquid water from water vapor in the exhaust gases. While positioned in the thermally-driven, power generation mode, the Stirling engine transfers heat from the heat source to generate electrical power.

DETAILED DESCRIPTION

Figure 1:
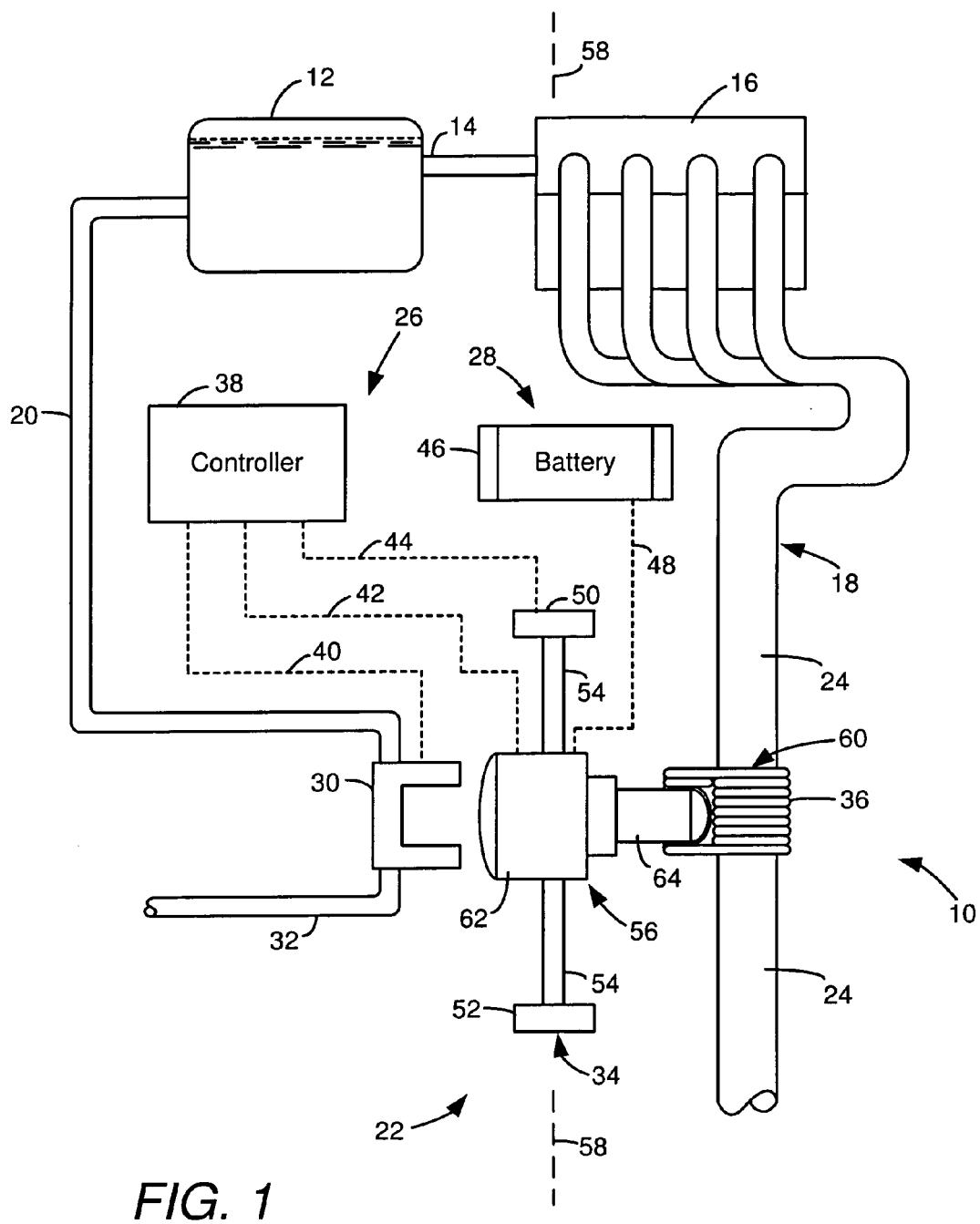
FIG. 1 is a schematic illustration of a vehicle engine assembly that includes a dual-function system, where the dual-function system includes a Stirling engine disposed in an electrically-driven, refrigeration mode for supplying water.

FIG. 1 is a schematic illustration of engine assembly 10, which is an engine assembly of a motorized vehicle, such as a military transportation vehicle used in a remote environment (e.g., desert environments). Engine assembly 10 includes fuel tank 12, primary fuel line 14, engine 16, exhaust pipe 18, secondary fuel line 20, and dual-function system 22. As discussed below, dual-function system 22 is configured to operate as a water recovery system for collecting water and as an APU for generating electrical power.

Fuel tank 12, primary fuel line 14, engine 16, and exhaust pipe 18 are standard engine components of a motorized vehicle. Fuel tank 12 supplies fuel to engine 16 via primary fuel line 14. Engine 16 is an internal combustion engine that emits exhaust gases through exhaust pipe 18 while running. Exhaust pipe 18 discards the exhaust gases from engine 16, and includes pipe wall 24. While exhaust pipe 18 is shown and described as a pipe, the term "exhaust pipe", as used herein, is intended to include any type of assembly that relays exhaust gases from a combustion engine. Pipe wall 24 is a standard exhaust pipe wall that extends from engine 16 to an exit of exhaust pipe 18. For ease of discussion, the emission control components disposed along exhaust pipe 18 (e.g., a catalytic converter and a muffler) are omitted.

Secondary fuel line 20 is an additional fuel line that interconnects fuel tank 12 and dual-function system 22 for supplying fuel to dual-function system 22. Dual-function system 22 is disposed between exhaust pipe 18 and secondary fuel line 20, and includes control system 26, battery system 28, heat source 30, vent line 32, rotatable assembly 34, and heat exchanger 36.

Control system 26 includes controller 38 and signal lines 40, 42, and 44, where controller 38 is an electronic control unit secured to the motorized vehicle. As discussed below, controller 38 allows an operator to direct the operation of heat source 30 via signal line 40, and to direct the operation of rotatable assembly 34 via signal lines 42 and 44. Battery system 28 includes battery 46 and electrical wires 48, where battery 46 is a rechargeable battery configured to both transmit and receive electrical power. Battery 46 is electrically connected to rotatable assembly 34 via electrical wires 48, which allows battery 46 to be remotely located from rotatable assembly 34.

Heat source 30 is a fuel-based burner connected between secondary fuel line 20 and vent line 32. Heat source 30 burns the fuel received from secondary fuel line 20 and air to generate heat (e.g., up to 650° C.). The exhaust gases from the ignited fuel exits heat source 30 through vent line 32. In an alternative embodiment, heat source 30 receives fuel from an auxiliary fuel tank, which avoids the need of connecting secondary fuel line 20 to fuel tank 12. This also allows different heat sources to be interchanged for heat source 30.

Rotatable assembly 34 includes drive hub 50, idler hub 52, shaft 54, and Stirling engine 56. Drive hub 50 is a motor-powered hub secured to a first end of shaft 54, and to a frame (not shown) of the vehicle. Drive hub 50 rotates shaft 54 around axis 58 based on signals relayed from controller 38 via signal line 44. Idler hub 52 is a second hub secured to an opposing end of shaft 54 from drive hub 50, and is also secured to the frame of the vehicle. Shaft 54 is an axle shaft extending along axis 58, and is rotatably secured to the frame of the vehicle via drive hub 50 and idler hub 52. One or more of drive hub 50, idler hub 52, and shaft 54 may also include ball-bearing assemblies (not shown) to assist the rotation of shaft 54.

Stirling engine 56 is a Stirling cycle-powered engine that includes engine body 62 and conductive head 64. Engine body 62 and conductive head 64 are standard Stirling engine components, which internally include a compressible gas (not shown), a power piston (not shown), and a displacer (not shown) for generating piston and displacer movement pursuant to a Stirling-cycle process. Suitable engines for Stirling engine 56 include engines that operate under Stirling-cycle processes, such as alpha-, beta-, and gamma-class Stirling engines. Examples of suitable commercially available Stirling engines include engines from Sunpower, Inc. Athens, Ohio; and Infinia Corporation, Kennewick, Wash.

Engine body 62 is secured to shaft 54 between drive hub 50 and idler hub 52. As a result of the secure connection between shaft 54 and engine body 62, the rotation of shaft 54 correspondingly rotates Stirling engine 56 around axis 58. Engine body 62 is also the portion of rotatable assembly 34 that receives signals from controller 38 via signal line 42, and that is electrically connected to battery 46 via electrical wires 48. Signal line 42 and electrical wires 48 are desirably flexible to remain connected to engine body 62 while Stirling engine 56 rotates around axis 58. Conductive head 64 is a heat-exchanging component that exhibits a thermal gradient during a Stirling-cycle process.

Heat exchanger 36 is an intermediate vapor-transport heat exchanger secured around pipe wall 24 of exhaust pipe 18 at location 60. Location 60 may be any place along exhaust pipe 18 between engine 16 and the exit of exhaust pipe 18, and is desirably situated after a catalytic converter (not shown) of the vehicle to reduce pollutants in the exhaust gases. Heat exchanger 36 is configured to engage with conductive head 64 of Stirling engine 56, and transfers heat between exhaust pipe 18 and conductive head 64. While shown as a vapor-transport heat exchanger, heat exchanger 36 may alternatively be any type of conductive or convective heat-transfer system for transferring heat between exhaust pipe 18 and conductive head 64.

As shown in FIG. 1, Stirling engine 56 is rotatably positioned around axis 58 such that conductive head 64 engages with heat exchanger 36. In this rotational position, Stirling engine 56 is in an electrically-driven, refrigeration mode, where Stirling engine 56 is configured to receive electrical power from battery 46 for reducing the temperature of pipe wall 24 at location 60 via heat exchanger 36.

While Stirling engine 56 is positioned in the refrigeration mode, controller 38 directs Stirling engine 56 (via signal line 42) to draw electrical power from battery 46 through electrical wires 48. This is performed with an electrical switch or switches (not shown) located within engine body 62, which is selectable between an input state, a deactivated state, and an output state based on the signals from controller 38. As such, controller 38 directs the electrical switch(es) to change from the deactivated state to the input state, thereby allowing Stirling engine 56 to draw electrical power from battery 46. The electrical power causes the compressible gas within Stirling engine 56 to expand and contract pursuant to a Stirling-cycle process, thereby causing conductive head 64 to become cold through a refrigeration effect.

Because conductive head 64 contacts heat exchanger 36, the cold temperature of conductive head 64 draws heat from heat exchanger 36, thereby reducing the temperature of heat exchanger 36. Correspondingly, heat exchanger 36 draws heat from pipe wall 24 at location 60, thereby reducing the temperature of pipe wall 24 at location 60. As discussed above, the exhaust gases of internal combustion engines, such as engine 16, contain water vapor. As the exhaust gases travel through exhaust pipe 18, the reduced temperature of pipe wall 24 causes water vapor in the exhaust gases flowing through exhaust pipe 18 to condense to liquid water on the inner surface of pipe wall 24. The condensed water may then be filtered and collected for use by personnel. Suitable systems and methods for filtering the collected water are disclosed in Jagtoyen et al., U.S. Pat. No. 6,581,375. Thus, while Stirling engine 56 is positioned in the refrigeration mode, and while engine 16 is running, dual-function system 22 functions as a water recovery system. This allows personnel to obtain water in remote locations and in emergency situations.

While conductive head 64 is shown in FIG. 1 as engaging with heat exchanger 36, dual-function system 22 may be designed in a variety of manners such that conductive head 64 transfers heat from exhaust pipe 18 while Stirling engine 56 is positioned in the refrigeration mode. For example, conductive head 64 may be designed to directly engage with pipe wall 24 of exhaust pipe 18 to draw heat from pipe wall 24. In this embodiment, heat exchanger 36 is omitted. In another alternative embodiment, which includes heat exchanger 36, a portion of heat exchanger 36 extends within exhaust pipe 18 at location 60 to increase the heat transfer rate. In this embodiment, a portion of pipe wall 24 at location 60 is removed and heat exchanger 36 is secured to pipe wall 24 such that a portion of heat exchanger 36 extends within exhaust pipe 18 at location 60.

As discussed above, shaft 54 and Stirling engine 56 are rotatable around axis 58. Prior to rotating shaft 54 and Stirling engine 56, controller 38 directs the electrical switch(es) within engine body 62 to change from the input state to the deactivated state. This cuts off the power supply from battery 46, which shuts down Stirling engine 56. To rotate Stirling engine 56 around axis 58, controller 38 directs drive hub 50 (via signal line 44) to rotate shaft 54 around axis 58. The rotation of shaft 54 correspondingly rotates Stirling engine 56 around axis 58, which disengages conductive head 64 from heat exchanger 36 and exhaust pipe 18. Drive hub 50 rotates shaft 54 and Stirling engine 56 until conductive head 64 engages with heat source 30. In this rotational position, Stirling engine 56 is in a thermally-driven, power generation mode, and functions as an APU.

Figure 2:
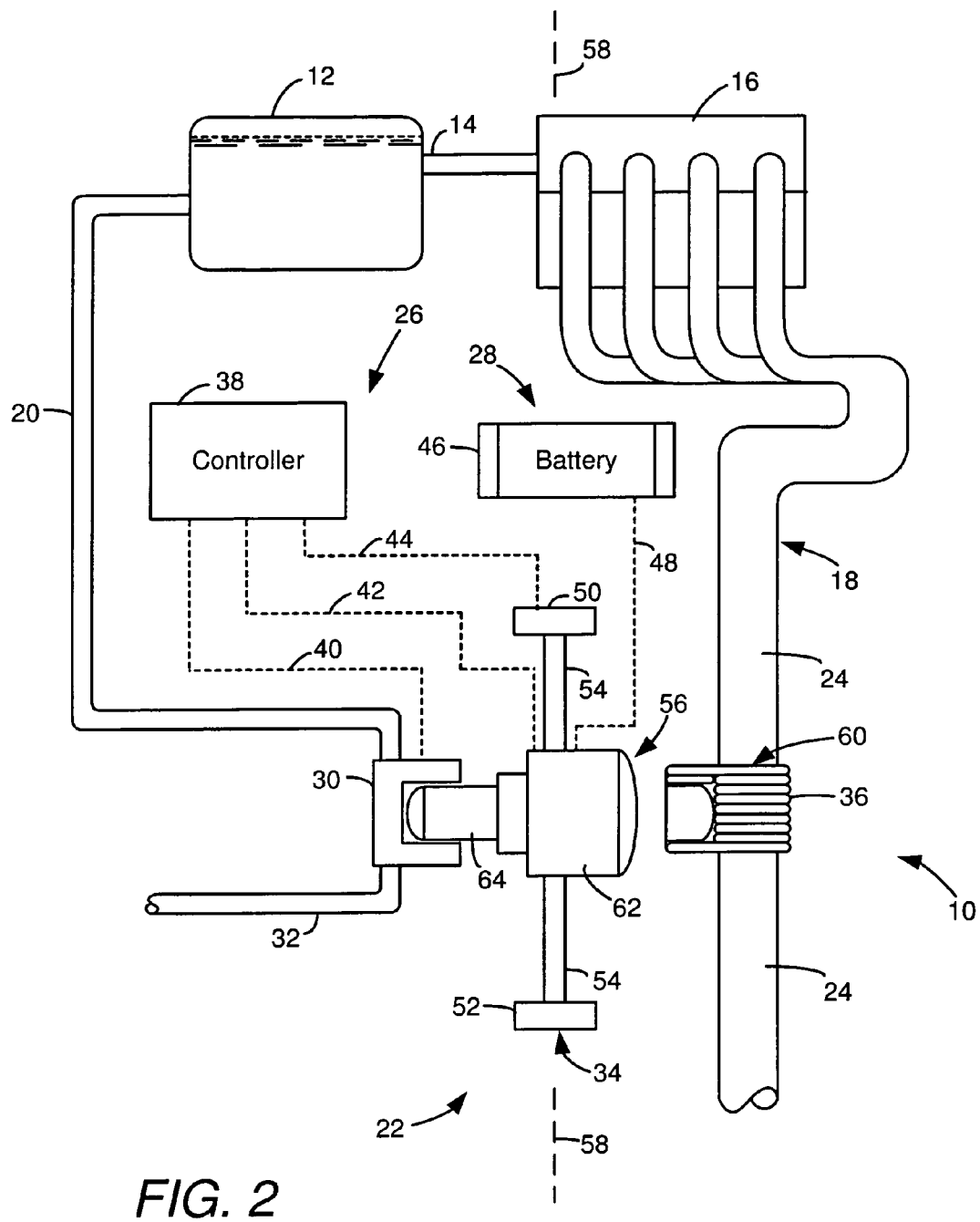
FIG. 2 is a schematic illustration of the vehicle engine assembly, where the Stirling engine of the dual-function system is disposed in a thermally-driven, power generation mode.

FIG. 2 is a schematic illustration of engine assembly 10, where Stirling engine 56 is positioned in the thermally-driven, power generation state. As shown, while Stirling engine 56 is positioned in the power generation state, conductive head 64 engages with heat source 30. During operation, controller 38 directs the electrical switch(es) (not shown) located within engine body 62 to change from the deactivated state to the output state (via signal line 42). This allows Stirling engine 56 to transmit generated electrical power to battery 46 through electrical wires 48.

Controller 38 also directs heat source 30 to receive fuel from secondary fuel line 20 and to ignite the fuel and air to generate heat in the proximity of conductive head 64 (via signal line 40). Conductive head 64 transfers the generated heat away from heat source 30 via convection and/or conduction, which causes the temperature of conductive head 64 to increase. This correspondingly causes the compressible gas within Stirling engine 56 to expand and contract pursuant to a Stirling-cycle process that is thermodynamically reversed from the refrigeration-based process discussed above. This causes Stirling engine 56 to generate electrical power, which is directed to battery 46 via electrical wires 48. Thus, in the power generation mode, Stirling engine 56 is configured to recharge battery 46 while relying on the fuel of fuel tank 12, thereby functioning as an APU. This allows personnel to obtain electrical power in remote locations for use with electronic equipment, such as surveillance, illumination, and communication equipment.

When an operator desires to switch Stirling engine 56 back to the refrigeration mode, controller 38 directs heat source 30 to shut off (via signal line 40), and directs the electrical switch(es) within engine body 62 to change from the output state to the deactivated state (via signal line 42). Controller 38 then directs drive hub 50 to rotate shaft 54 back around axis 58 in an opposite rotational direction from the previous rotation. This causes conductive head 64 to disengage from heat source 30 and rotate around axis 58 until conductive head 64 engages with heat exchanger 36. In an alternative embodiment, drive hub 50 is configured to rotate shaft 54 and Stirling engine 56 in the same rotational direction around axis 58 during each rotational period (i.e., shaft 54 and Stirling engine 56 rotate 360 degrees to return to the original position). This embodiment requires more space for the rotational range of Stirling engine 56, but reduces the mechanical complexity of drive hub 50.

Rotating Stirling engine 56 between the refrigeration mode and the power generation mode allows a single Stirling engine to alternatively function as a water recovery system for collecting water and as an APU for generating power. This reduces material costs, installation costs, and space that are otherwise necessary with the use of multiple systems. While Stirling engine 56 is configured to rotate between the refrigeration mode and the power generation mode, Stirling engine 56 may alternatively be repositioned between the refrigeration mode and the power generation mode in a variety of manners based on the arrangement of engine assembly 10 (e.g., linear movement). However, rotating Stirling engine 56 between the refrigeration mode and the power generation mode provides an efficient means to operate dual-function system 22.

In an alternative embodiment, dual-function system 22 is controlled in a manual manner rather than the electronic manner discussed above. In this embodiment, controller 38 and signal lines 40, 42, and 44 are omitted, and an operator manually rotates shaft 54 and Stirling engine 56 around axis 58 between the refrigeration mode and the power generation mode. Heat source 30 is also manually ignited when Stirling engine 56 is positioned in the power generation mode.

While discussed above as being used with a motor vehicle, dual-function system 22 may alternatively be used with a variety of remotely-operated equipment that emit exhaust gases containing water vapor. For example, in addition to military applications, dual-function system 22 is suitable for use with motorized machines such as industrial mining equipment and oil-rigging platforms. By allowing Stirling engine 56 to be positioned between a refrigeration mode and a power generation mode, a single system (i.e., dual-function system 22) may be used with such machines to provide water and electrical power when needed.

Although the present invention has been described with reference to preferred embodiments, workers skilled in the art will recognize that changes may be made in form and detail without departing from the spirit and scope of the invention.

The invention claimed is:

1. A dual-function system for use with a motorized machine having an exhaust pipe, the dual-function system comprising:
   a heat source; and
   a Stirling engine movably secured to the motorized machine, and being positionable to operate in a refrigeration mode in which the Stirling engine is configured to remove heat from at least a portion of the exhaust pipe, the removal of heat causing condensation of water vapor flowing through the exhaust pipe, and being positionable to operate in a power generation mode in which the Stirling engine is configured to receive heat from the heat source to generate electrical power.

2. The dual-function system of claim 1, further comprising a shaft rotatably secured to the motorized machine, wherein the Stirling engine is secured to the shaft.

3. The dual-function system of claim 2, further comprising a motorized hub secured to the motorized machine and configured to rotate the shaft.

4. The dual-function system of claim 1, further comprising a heat exchanger secured to the exhaust pipe and configured to transfer heat from at least a portion of the exhaust pipe to the Stirling engine while the Stirling engine is positioned in the refrigeration mode.

5. The dual-function system of claim 1, further comprising a battery electrically connected to the Stirling engine.

6. The dual-function system of claim 5, wherein the Stirling engine is configured to draw electrical power from the battery while positioned in the refrigeration mode.

7. The dual-function system of claim 6, wherein the Stirling engine is further configured to transmit electrical power to the battery while positioned in the power generation mode.

8. The dual-function system of claim 1, further comprising an electronic control unit operably connected to the heat source and the Stirling engine.

9. A dual-function system for use with a motorized machine having an exhaust pipe, the dual-function system comprising:
   a heat source;
   a heat exchanger secured to the exhaust pipe; and
   a Stirling engine movably secured to the motorized machine and having a conductive head, wherein the conductive head engages the heat exchanger while the Stirling engine is positioned to operate in a refrigeration mode to remove heat from at least a portion of the exhaust pipe, the removal of heat causing condensation of water vapor flowing through the exhaust pipe, and wherein the conductive head engages the heat source while the Stirling engine is positioned to operate in a power generation mode for transferring heat from the heat source to the Stirling engine, causing the Stirling engine to generate electrical power.

10. The dual-function system of claim 9, further comprising a shaft rotatably secured to the motorized machine, wherein the Stirling engine is secured to the shaft.

11. The dual-function system of claim 10, further comprising a motorized hub secured to the motorized machine and configured to rotate the shaft.

12. The dual-function system of claim 9, further comprising a battery electrically connected to the Stirling engine.

13. The dual-function system of claim 12, wherein the Stirling engine is configured to draw electrical power from the battery while operating in the refrigeration mode.

14. The dual-function system of claim 13, wherein the Stirling engine is further configured to transmit electrical power to the battery while operating in the power generation mode.

15. A dual-function system for use with a motorized machine having an exhaust pipe, the dual-function system comprising:
   a heat source;
   a shaft rotatably secured to the motorized machine;
   a Stirling engine secured to the shaft and rotatably positionable between a refrigeration mode and a power generation mode, the Stirling engine being configured to condense water vapor flowing through the exhaust pipe while positioned to operate in the refrigeration mode and to engage with the heat source to generate electrical power while positioned to operate in the power generation mode.

16. The dual-function system of claim 15, further comprising a heat exchanger secured to the exhaust pipe and configured to transfer heat from the exhaust pipe while the Stirling engine is positioned to operate in the refrigeration mode.

17. The dual-function system of claim 15, further comprising a battery electrically connected to the Stirling engine.

18. The dual-function system of claim 17, wherein the Stirling engine is configured to transfer the generated electrical power to the battery while positioned to operate in the power generation mode.

19. The dual-function system of claim 15, further comprising an electronic control unit operably connected at least to the shaft.

* * * * *